United States Patent [19]

Pontius

[11] Patent Number: 4,955,995
[45] Date of Patent: Sep. 11, 1990

[54] RANGE HOOD FILTER PAD

[75] Inventor: Jeffrey S. Pontius, Amanda, Ohio

[73] Assignee: Columbus Industries, Inc., Ashville, Ohio

[21] Appl. No.: 386,228

[22] Filed: Jul. 28, 1989

[51] Int. Cl.⁵ .................. B01D 46/10; B01D 50/00
[52] U.S. Cl. .................................. 55/274; 55/316;
55/467; 55/486; 55/524; 55/DIG. 36
[58] Field of Search ............... 55/274, 316, 467, 486,
55/487, 512, 524, 527, DIG. 36

[56]  References Cited

U.S. PATENT DOCUMENTS

| | | | |
|---|---|---|---|
| 2,070,073 | 2/1937 | Walton | 55/524 |
| 2,341,097 | 2/1944 | Heebink | 55/487 |
| 2,602,521 | 7/1952 | Smith | 55/487 |
| 2,989,145 | 6/1961 | Goodloe | 55/524 X |
| 3,076,302 | 2/1963 | Shoemaker | 55/487 |
| 3,891,417 | 6/1975 | Wade | 55/274 |
| 4,047,914 | 9/1977 | Hansen et al. | 55/274 X |
| 4,130,487 | 12/1978 | Hunter et al. | 55/274 X |
| 4,259,096 | 3/1981 | Nakamura et al. | 55/524 X |
| 4,336,038 | 6/1982 | Schultheiss et al. | 55/274 |
| 4,610,705 | 9/1986 | Sarnosky et al. | 55/486 X |

FOREIGN PATENT DOCUMENTS

| | | | |
|---|---|---|---|
| 2514735 | 10/1976 | Fed. Rep. of Germany | 55/274 |
| 3325753 | 1/1985 | Fed. Rep. of Germany | 55/274 |
| 51-057673 | 5/1976 | Japan | 55/274 |
| 51-057674 | 5/1976 | Japan | 55/274 |
| 2028162 | 3/1980 | United Kingdom | 55/274 |

Primary Examiner—Robert Spitzer
Attorney, Agent, or Firm—Francis T. Kremblas, Jr.

[57]  ABSTRACT

A filter pad for range hoods is disclosed which comprises a plurality of sheets formed of wood paper pulp fiber material. Each sheet is slit and expanded to form a plurality of adjacent multi-sided openings. The outermost sheet on the upstream side of the pad is provided with a plurality of parallel sets of three printed lines formed by oil soluble dye components. The lines flanking each central line in each set are of selected different colors. Each line adjacent to the central line in each set is spaced at a selected distance from the central line to permit the different color dye components to bleed together upon a given loading level of the pad with oil and fat aerosols to form a band having a third different color to visually indicate that the filter pad is in need of replacement.

7 Claims, 1 Drawing Sheet

U.S. Patent  Sep. 11, 1990  4,955,995

RANGE HOOD FILTER PAD

BACKGROUND ART

The present invention relates generally to filter media and particularly to a disposable type particulate filter media for use in kitchen range hood applications wherein the media is exposed to oil and fat aerosols. Typically, range hoods include a motor driven fan to draw cooking aerosols and associated particulates in the air stream through a filter pad supported in the range hood to entrap the oil and fat type aerosols created during the cooking process. Such aerosols are often referred to as grease and include those oils and fats which are liquid and solid at room temperature.

Prior disposable filter media for range hood cooking applications have consisted of synthetic fiber type filter pads or a combination of materials predominantly employing non-woven synthetic fibers formed into a relatively dense mat or pad having relatively small interstices between the fibers for the passage of air. These types of filters do satisfactorily entrap the oil and fat aerosols. However, in this type of filter there is a tendency for the aerosols to be deposited on the fibers where they tend to locally agglomerate and are not spread evenly throughout the filter pad.

A relatively dense non-woven synthetic fiber pad is particularly necessary when the pad is provided with printed indicia to provide a relatively visual distinct pattern to indicate in some manner that the filter has become loaded to the point requiring replacement.

U.S. Pat. No. 4,336,038 illustrates such a prior art nonwoven synthetic fiber filter mat provided with means to visually signal a given loading of the filter with oil and fat aerosols. This patent discloses a system wherein a mixture of two dye components, one oil soluble and the other oil insoluble, are used to print a selected pattern of the mixture on the face of the filter. The purpose of this system is to provide a visual color change from the initial predominant oil insoluble component to the less dominant oil soluble dye component upon loading of the filter with oil and fat aerosols.

However the oil insoluble dye component may prematurely bleed when introduced to water vapor in the form of steam or high humidity formed in ordinary cooking processes and distort the original pattern. This could lead to a confusing visual signal to the untrained user. Additionally, the desired visual signal consists of the bleeding of the oil soluble component into relatively small uncolored spaces between the printed pattern and requires a visual judgment which may be difficult for the uninitiated user as to just when the desired limit of oil and fat loading of the filter has been reached.

Further, the relatively dense nature of such a predominantly non-woven synthetic fiber pad raises the pressure drop across the pad and therefore draws less air flow through the pad for a given size range hood fan. The relatively dense nature of the pad required to permit printing of easily recognized indicating indicia on its face is disadvantageous to the efficiency of drawing the particulate laden air produced during the cooking process through the filter.

A range hood filter pad which incorporates a reliable visual signal to the user indicating replacement is due and which possesses a relatively low resistance to air flow, yet efficiently filters particulates has not been developed by those skilled in the art.

BRIEF DISCLOSURE OF INVENTION

The present invention relates to kitchen range hood filters and particularly to an improved disposable range hood filter media and an improved visual indicating means to provide appropriate notice to the user that a replacement filter is required.

The improved range hood filter of the present invention comprises a pad formed by plurality of absorbent sheets of wood paper pulp fibers preferably Kraft paper as referred to in the art. Each sheet is split and expanded to create a plurality of adjacent multi-sided, relatively large openings for the flow of air. The combination of the tortuous path and interstices created between the overlapping sheets functions to retain particulate material drawn into the filter pad.

However, the absorbent quality of the wood paper pulp sheets tend to absorb liquid oil and fat aerosols in a manner which reduces the tendency of these materials to locally accumulate as the oils tend to become more evenly distributed through the layers of the filter pad over a span of time. This feature is particularly important regarding providing a visual signal in accordance with the present invention as the spread of the oil carries the oil soluble dyes in a manner which can be employed to provide a more clear and consistent signal to the user indicating a change of the filter is due.

The openings in each sheet are preferably formed by known split and expanding methods to create multi-sided openings wherein adjacent openings share a common web or side. The multiple layers with relatively large openings, as compared to densely packed non-woven synthetic fiber pads, form what is referred to in the art as an impingement type filter.

The eventual accumulation of oil and fat aerosols and other particulate matter in the filter reach a point wherein the filter media should be replaced from time to time. However, when dealing with oil and fat deposits in a cooking environment, undue loading of fat and oil deposits also represents a safety and sanitary hazard particularly relating to the build-up of bacteria. Since such loading is not easily noticeable by the user, means for visually indicating that a replacement of the filter is required is highly desirable.

According to a preferred embodiment of the present invention, a plurality of sets of three spaced parallel lines are formed on the first sheet of the filter using oil soluble dye components. The center line of each set of three lines is of one selected color. Each line adjacent to the center line is formed using a selected color different than the center line.

Upon loading of the filter media with oil and fat aerosols, the oil soluble dye components from each line tend to bleed and spread into the uncolored area between adjacent lines. This results in a mixing of the two different color dye components to create a visually distinct third color in the area between the center line and each next adjacent line to the centerline. The distance between the lines in each set is selected so that the color change occurs at a selected loading level of oil and fat aerosols to clearly indicate the filter pad should be replaced.

As another aspect of the present invention, the dye components selected to form the indicator lines should be resistant to premature bleeding from factors other than oil and fat aerosols so as not to provide a false or confusing visual impression to the user and to retain their original form during shipping or storage prior to sale. Therefore exposures to water, steam, heat, or ultraviolet light should have no appreciable effect on the dye components which would destroy their ability to function in the manner described.

Therefore it is one object of the present invention to provide an improved range hood filter media which is relatively inexpensive to manufacture and fabricate for disposable applications and which tends to absorb oil and fat aerosols into the structure of the media in a manner to provide a relatively even distribution of the oil in the media over time.

It is another object of the present invention to provide a filter pad of the type described which includes an improved means providing a visual signal to the user to more clearly indicate that the filter media is in need of replacement.

It is a further object of the present invention to provide a multi-layer filter pad of the type described which exhibits a relatively low pressure drop across the filter, yet provides highly satisfactory efficiency relating to the types of particulate matter encountered during typical residential cooking applications.

Further objects and advantages of the present invention will be apparent from the following description, references being had to the accompanying drawings wherein a preferred form of embodiment of the invention is clearly shown.

DETAILED DESCRIPTION

Figure 1:
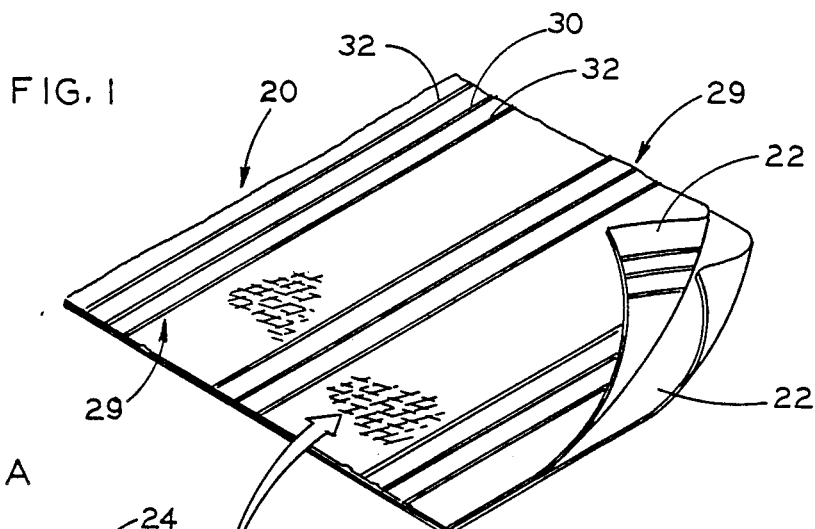
FIG. 1 is a perspective view of a filter pad constructed in accordance with the present invention.
Figure 1A:
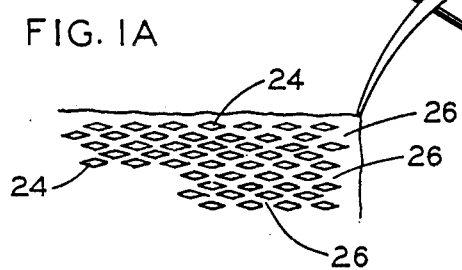
FIG. 1A is a schematic view of a portion of one sheet of the filter pad shown in FIG. 1 generally illustrating the configuration of the split and expanded openings formed in each of the sheets comprising the filter pad.

A disposable filter pad 20 for installation in a range hood is shown in FIG. 1 and is constructed in accordance with the present invention. The pad 20 comprises a plurality of separate sheets 22 of a paper material conventionally formed of non-woven wood pulp fibers. The paper sheet material known in the art as Kraft paper is a preferred material which withstands the slit and expanding process quite well. Each sheet is provided with a plurality of slit and expanded diamond shaped openings, such as 24, as seen in FIG. 1A. Openings 24 are formed in a conventional slit and expanding process well-known to those skilled in the art.

The number of sheets 22 and the size of the openings 24 may be varied according to the desired pressure drop across the filter pad and the desired selected efficiency of the filter. A filter pad comprising a plurality of overlapping sheets 22 creates a tortuous path having many interstices formed between the sheets to entrap particulate matter in the air stream drawn through the filter. The smaller the openings 24 or the more individual sheets overlaying one another, increase the filtering efficiency and the pressure drop across the filter. These two factors compete in a given application as efficiency is desirable, however, large pressure drops require more energy to draw the air stream carrying particulates through the filter. Therefore, a compromise is usually necessary to achieve a practical efficiency at the lowest effective pressure drop for the selected application.

As shown in FIG. 1A, openings 24 are enlarged as are the webbings 26 between each opening 24 which cover an entire sheet 22. Each opening 24 in a split and expanded sheet 22 shares webs 26 with adjacent openings.

With respect to range hood filters, oil and fat aerosols are typically generated during many cooking processes. Such "greasy" aerosols tend to cause local agglomerates of the particulate matter in the prior art types of range hood filters as such filters conventionally comprise a mat of non-woven synthetic fibers or a mixture predominantly comprised of synthetic fibers to form relatively small interstices to entrap or strain the particulate matter from the air flow. As fat and oil aerosols are entrapped by such filters, other particulate matter drawn into the air stream tend to stick to these greasy substances tending to form larger localized agglomerations. Formation of localized agglomerations of these deposits tend to reduce the more desirable even distribution of entrapped particulates through the filter and can function to increase the pressure drop through the filter more quickly than desired.

However, using the multi-layer of wood-pulp paper sheet material of the present invention, the retained oil and fat aerosols tend to be absorbed into the sheet material over time and become more evenly distributed through the sheet layer. Since all disposable filters reach a given capacity of loading which requires replacement, it is highly desirable to provide means to visually indicate to the user that such a level has been reached. Accordingly, the present invention provides such a visual signal in the form of a plurality of parallel sets of three lines, indicated generally at 29, printed on at least the front or first sheet 22 facing the incoming air stream.

A centrally disposed line 30 is flanked by adjacent lines 32 in each set 29. Line 30 has a first selected color contrasted from lines 32 of a different color. The colors are selected to form a visually distinct third color upon mixing.

The width of lines 30 and 32 and the distance between these lines in each set 29 is important to provide a reliable visual signal to the user indicating when the filter should be changed as described in detail later herein.

As the front layer 22 of the filter 20 is contacted with oil and fat aerosols, the oil soluble dye components forming lines 30 and 32 begin to bleed outwardly into the space between the lines. As the different color dye components begin to mix with one another in an area 34 between lines 30 and 32, the color of the mixture changes from the two original colors to a selected visually distinct third color. For example, a blue center line 30 and yellow lines 32 form a distinct green color upon mixing in the area 34 between lines 32 and 30.

With the appropriate size of each original line and the distance between the lines, a distinct visual signal constituting a band or line having new and different color appear in area 34 to alert the user that the desired maximum loading has been reached and the filter pad 20 should be replaced.

It is important that the visual signal be clear and definite so as not to introduce a false or confusing signal or one which requires significant visual judgment. A false or inconsistent signal may tend to lead the user to ignore the visual signal and increases the potential of failing to properly dispose of a filter which has become unduly loaded with oil or fat aerosols. An undue loading of oil and fat deposits tend to increase the undesirable, unsanitary buildup of bacteria in the filter, cause obnoxious odors, and further may lead to a fire hazard.

Therefore according to the present invention, all the indicator lines 30 and 32 are formed using oil soluble dye components which resist bleeding except when contacted by oil or fat compositions.

Such dye components resist bleeding when subjected to heat, humidity and steam, for example, which are encountered in typical cooking environments. Therefore lines 30 or 32 retain their original width and do not bleed into the space or area 34 between the lines merely due to water or steam exposure which is invariably part of the cooking environment but does not in and of itself effect the efficiency of the filter pad.

Extensive testing of filter pads made in accordance with the present invention relative to extreme environmental conditions such as high and low temperature, ultraviolet light, humidity and/or steam have shown the oil soluble dye components resist premature bleeding. No visibly observable color change or distortion of the original printed lines was noted during such tests which would be likely to interfere with the ability to provide the intended visual signal.

The colors chosen for lines 30 and 32 should be different from one another and when mixed produce a clearly visually distinguishable third color.

The preferred embodiment of the present invention employed a blue dye (1,4 dialkylamino anthraquinone) which is a mixture of symmetrical and unsymmetrical alkylamino anthraquinones. Any conventional carrier solvent well-known to the art may be used to implement conventional printing techniques to form lines 30 and 32 on a sheet 22.

The other preferred dye used in cooperation with the above blue dye is a yellow dye which is a mixture of phenol, 2,2' -[(3,3' - dimethyl (1,1' - biphenyle) - 4',4-diyl) bis (azo) bis [4-nonyl, and 2 - naphthalenol [(phenylazo) phenyl] azo alkyl. This dye is also dissolved in a conventional carrier solvent used to print the dye upon the sheet 22.

However, other oil and fat soluble dyes having similar properties and of sufficiently different color to create an easily distinguishable third color could be employed without departing from the present invention.

Lines 30 and 32 are easily formed using standard known printing methods and dye/solvent mixtures typically compatible for the intended purpose. Typical printing mixtures comprise about one percent of the dye component.

The spacing between adjacent parallel lines 30 and 32 and the width of the lines is important to properly achieve the intended appropriate visual signal related to creating a distinct third color upon a given loading level of oil and fat aerosols.

Further, the wood pulp paper comprising sheets 22 is important since the oil and fat aerosols tend to bleed or migrate at a relatively uniform rate across the sheet material. Therefore, as the oil aerosols contact the oil soluble dye components, the dye component dissolved in the oil gradually spreads or migrates outwardly from lines 30 and 32. The "bleed rates" of the oil carrying the dye components have been tested to determine the relationship between the loading of the filter with oil and the distance which the dye components contacted by the oil will migrate from their original position.

Extensive testing has confirmed that each line 30 and 32 should be between about 0.090 to 0.140 inches wide to provide a sufficient amount of dye to bleed toward the area between the lines. The preferred width of lines 30 and 32 is about 0.110 to 0.130 inches. The line 30 located between lines 32 is at least equal to the lines 32 within the above noted ranges.

The distance between the adjacent facing edges of lines 30 and 32 should be between about 0.240 to 0.335 inches to provide an appropriate area between the lines where the two different colors will eventually bleed together within a reasonable time to create a third clearly distinguishable color signal indicating that a selected maximum loading of oil has been reached. The preferred distance between lines 30 and 32 is about 0.260 to 0.310 inches which permits a distinctly visible green color band or line to form approximately in the middle of area 34 when the preferred selected loading level has been reached. The green color band formed is about 0.090 inches in width when the loading level of oil and fat aerosols in the filter reaches an amount which is selected as the preferred maximum limit requiring a filter replacement. This green line or band is a rather easily seen visual change alerting the user that replacement of the filter is due.

The distance between lines 30 and 32 in each set 29 has been determined based upon bleeding rates of the dye components versus the loading levels of fat and oil aerosols. The maximum level of fat and oil aerosols in a given filter pad design relating to the number of sheets 22 employed is chosen on the basis of safety and sanitary considerations as well as the effectiveness of the filter. Under tests conducted during actual cooking conditions, it was estimated that approximately three to four grams of oil and fat aerosols per square foot of filter surface area represented a sufficient degree of loading to require replacement of the filter pad to observe reasonable health and safety purposes.

With this loading level, a distinct and visually contrasting green color band will appear between lines 30 and 32 as the blue and yellow dye mix in area 34.

Such a loading was determined to occur upon exposure of the filter pad in a conventional range hood to about 60 hours of cooking which generates oil and fat aerosols. Such cooking practices correspond to about five to ten months use in an estimated average residential setting of four people. In view of the potential for the build-up of bacteria or offensive odors, significantly longer life-cycles for a filter pad is not considered desirable in the trade. Cooking practices in any individual instance may vary such estimate of time for such loading to occur.

However, it is important to note that the oil soluble dye components will not prematurely bleed upon exposure merely to heat, humidity or steam and only respond to oil and fat soluble aerosols.

Further, there is no change from the blue and yellow original colors until the maximum loading is closely approached. Therefore the user is provided with a very simple and easily visible signal by the formation of a new and different color compared to the two original colors present. Very little if any judgment is therefore required to an average user to detect the filter pad should be replaced since the observance of an entirely different color is the operative signal. There is no need to observe how far the original colors may have bled into any area and make a judgment as to whether or not the colors have spread a sufficient distance to indicate the end of the recommended useful life of the filter pad. Therefore using the filter pad of the present invention, it is less likely that a user will be confused as to when the filter pad should be replaced.

The number of three line sets is dependent upon the size of the filter, however, spacing each set about 0.950 to 1.001 inches apart is deemed adequate for the indicating function as well as the general attractive appearance to the user.

Figure 2:
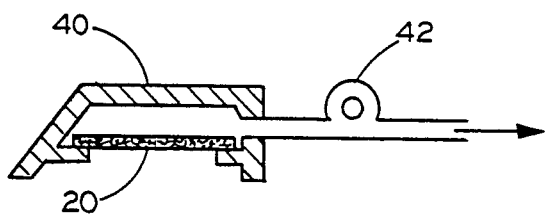
FIG. 2 is a schematic cross-sectional view of the filter pad shown in FIG. 1 installed in a range hood.
Figure 3:
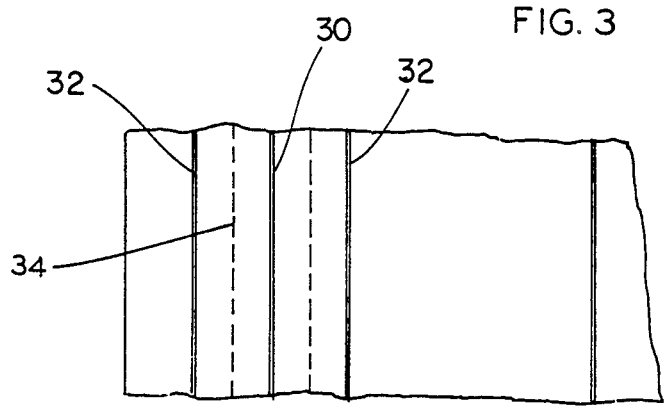
FIG. 3 is a schematic view of the filter pad shown in FIG. 1 illustrating an enlargement of the three lines in each set of indicator lines shown in FIG. 1.

With reference to FIG. 2, a schematic view illustrating a range hood 40 with a filter pad 20 inserted in the air stream drawn through the hood by a motor driven fan 42 is shown. Conventionally known range hoods may differ in construction, however, for purposes of the present invention, the filter pad 20 is usable in a generally conventional manner well-known in the art with various specific supporting structure to removably mount the filter pad in the range hood.

The outermost sheet 22 exposed initially to the incoming air stream preferably carries the lines 30 and 32 and is readily visible to the user.

Preferably, a filter pad 20 is supported in a conventional manner in a frame surrounding its edges and may include a wire mesh support screen on both sides if desired. Such means of support are well-known and therefore not shown. It should be understood, however, that since the filter pad 20 is intended to be disposable, any such support component should be relatively inexpensive in any commercially practical setting.

One of the important advantages of employing the slit and expanded Kraft paper sheets in the pad of the present invention is that indicator lines 30 and 32 may be formed by conventional printing techniques in a clearly defined and yet attractive manner without resorting to a densely packed non-woven synthetic fiber pad. It has been found that employing a first sheet having slit and expanded openings provide easily discernable attractive indicating lines, yet offer a significantly lower pressure drop. Particularly since the remaining plural sheets 22 may be formed with larger slit and expanded openings to maintain low pressure drop values while maintaining highly satisfactory filtering efficiency. It should also be pointed out that it is possible to include a loosely non-woven synthetic filter pad adjacent to the downstream face of sheets 22 and still maintain the significantly reduced resistance to air flow through the entire filter assembly.

For example, a range hood filter pad in accordance with the present invention and offered to the trade includes four slit and expanded sheets 22 backed by a relatively loosely packed non-woven synthetic fiber pad impregnated with activated carbon to remove obnoxious odors. This particular combination offers the advantages of the visual indicating means of the present invention, an odor removal feature, and yet a comparably low pressure drop across the whole of the filter assembly ranging from about 0.0200 inches of water at an air flow velocity of 50 feet per minute to 0.2575 inches of water at an air flow velocity of 300 feet per minute.

Therefore even with the additional non-woven carbon impregnated, non-woven pad as backing, the pressure drop values are significantly lower than typical prior art range hood filters, particularly those having visual indicating means printed on their face.

While certain preferred embodiments of the present invention have been disclosed in detail, it is to be understood that various modifications may be adopted without departing from the spirit of the invention or scope of the following claims.

I claim:

1. In combination with a range hood, a particulate filter comprising:
    (a) a support structure;
    (b) a filter pad including a plurality of sheets of absorbent paper filter media of non-woven wood fibers, said sheets aligned in adjacent, parallel relationship to one another and supported in said support structure;
    (c) a plurality of slits in each sheet expanded to define multi-sided discrete openings for the passage of air and a tortuous path for air flow passing between adjacent sheets;
    (d) said support structure and filter pad mounted in said range hood and disposed in an air flow for entrapping particulate matter and organic fat and oil aerosols generated during cooking processes; and
    (e) visual indicating means disposed on an outermost sheet of said filter pad comprising a plurality of sets of three parallel spaced lines formed by at least two oil soluble dye components, the center line of each of said sets of lines being a selected first color and the next adjacent lines to said center line being a selected second color different than said first color; said colors being selected to form a visually distinct third color different than said first and second colors upon mixing of said first and second colors at a selected location between said center line and the next adjacent lines in each of said sets.

2. A particulate filter pad in combination with a range filter hood, the filter pad comprising a plurality of parallel aligned sheets, each sheet being a wood pulp paper material including a plurality of slit and expanded openings, each of said opening comprising a generally diamond shaped configuration; and a plurality of parallel spaced lines formed on an outer most sheet, each line comprising an oil soluble dye component having a different color from the next adjacent line, the distance between adjacent parallel lines being determined by the rate of bleeding of each dye component based upon the loading of said media with oil and fat aerosols to cause a blending of the dye components of adjacent lines to form a visually distinct contrasting color than each of said adjacent lines at a selected area between said lines.

3. The filter pad defined in claim 2 wherein the distance between each adjacent pair of lines is between about 0.295 to 0.335 inches.

4. The filter pad defined in claim 3 wherein the width of each of said lines is between about 0.108 to 0.135 inches.

5. The apparatus defined in claim 2 including a non-woven, synthetic fiber sheet disposed adjacent to the downstream side of said filter pad.

6. The apparatus defined in claim 5 wherein said synthetic fiber sheet is impregnated with activated charcoal to adsorb offensive odors.

7. The apparatus defined in claim 5 wherein the pressure drop across said paper sheets and synthetic fiber sheet assembly is no greater than about 0.0200 inches of water at an air flow velocity of about 50 feet per minute.

* * * * *